United States Patent

Van Gestel

[11] Patent Number: 6,061,095
[45] Date of Patent: May 9, 2000

[54] TRANSMISSION OF DATA ITEMS

[75] Inventor: Henricus A. W. Van Gestel, Eindhoven, Netherlands

[73] Assignee: U.S. Philips Corporation, New York, N.Y.

[21] Appl. No.: 08/784,677

[22] Filed: Jan. 21, 1997

[30] Foreign Application Priority Data

Jan. 22, 1996 [EP] European Pat. Off. .............. 96200148

[51] Int. Cl.$^7$ ............................ H04N 7/00; H04N 11/00; H04N 7/08; H04N 11/087
[52] U.S. Cl. ......................... 348/474; 348/460; 348/461; 348/467
[58] Field of Search ..................................... 348/460, 461, 348/463, 464, 465, 467, 468, 473, 474, 478, 476, 563, 564, 569, 906; H04N 7/08, 7/087, 7/093, 7/00, 11/00

[56] References Cited

U.S. PATENT DOCUMENTS

| | | | |
|---|---|---|---|
| 4,054,911 | 10/1977 | Fletcher et al. | 348/467 |
| 4,393,404 | 7/1983 | Cox et al. | 348/467 |
| 5,541,662 | 7/1996 | Adams et al. | 348/474 |

FOREIGN PATENT DOCUMENTS

0628919A2  12/1994  European Pat. Off. .

OTHER PUBLICATIONS

"Protocol for a TV–Guide using Electronic Data Transmission, Draft 1", EACEM Technical Report No. 11, Aug. 1995.

*Primary Examiner*—Michael Lee
*Attorney, Agent, or Firm*—Laurie E. Gathman

[57] ABSTRACT

An arrangement and method is disclosed for transmitting data items to a receiver for selective display on said receiver. The data items may collectively constitute an electronic television program guide or a database of products and services for electronic shopping purposes. By transmitting auxiliary presentation and navigation information, the information provider may determine how a receiver displays the data items and how the receiver needs to respond to user actions. Sometimes, however, it is desirable for a receiver to respond in a setmaker-defined manner, even if navigation and presentation data are provided by the setmaker. In order to solve possible conflicts between the information provider's interests and the setmaker industries' interests, the transmission includes a copyright bit which allows an information provider to indicate explicitly whether or not a receiver is allowed to ignore the transmitted presentation and/or navigation data.

12 Claims, 2 Drawing Sheets

TRANSMISSION OF DATA ITEMS

FIELD OF THE INVENTION

The invention relates to an arrangement and method for transmitting data items to a receiver for selective display on said receiver. The data items may collectively constitute an electronic television program guide or a database of products and services for electronic shopping purposes. The invention also relates to a receiver and method for receiving and selectively displaying said data items. Such a receiver may be a television receiver, a video recorder, a personal computer or a dedicated terminal, for example, a home-shopping terminal.

BACKGROUND OF THE INVENTION

A typical example of a known method of transmitting an electronic television program guide is disclosed in "Protocol for a TV-Guide using Electronic Data Transmission, Draft 1", EACEM Technical Report No.11, August 1995. In this prior-art method, a plurality of data items such as start time, stop time, title, etc. of television programs to be broadcast are transmitted by one or more television stations.

In order to allow a variety of broadcasts and decoders to be developed, the concept of "Type of Electronic Program Guide (EPG)" has been introduced. EPG type-1 information transmitted on a television channel merely provides the transmission of What's Now and What's Next on the respective TV channel. EPG type-2 information comprises the data items for today's and tomorrow's television programs on this channel. EPG type-3 information covers a larger period of time and includes the data items of other television channels as well. EPG type-3 information includes auxiliary data to instruct a receiver to display the TV guide in a format determined by the information provider and to allow the user to navigate through the TV guide in a manner specified by the information provider. EPG type-3 transmissions are the most attractive from the information provider's point of view. They have the greatest similarity with the current printed versions of TV guides and allow the information provider to present his guide in a self-defined, easy-to-recognize, private "house" style.

At the receiver end, EPG decoders may also have different levels of complexity and exhibit different levels of attractiveness to the public. Setmakers may manufacture various types of decoders for different cost prices, inter alia by using different amounts of memory. Type-1 decoders merely gather the few relevant data items to be displayed and present them in a manner defined by the decoder manufacturer, i.e. the setmaker. Type-2 decoders have additional means to allow the user to navigate through the plurality of data items. These navigation means, and hence the in attractiveness, are also setmaker-defined. Type-3 decoders comply completely with the transmitted display format and navigation instructions, if any.

The EPG standard provides some form of compatibility between different types of decoders and different types of transmission. For example, a type-2 decoder without appropriate means for receiving and processing presentation and navigation data may nevertheless be adapted to receive EPG type-3 information. Such a decoder will ignore the transmitted presentation and navigation data, and present and navigate through the information in a locally defined manner.

OBJECT AND SUMMARY OF THE INVENTION

It is an object of the invention to provide a more flexible arrangement and method for transmitting EPG information.

The invention is based on the recognition that a problem may arise if an EPG decoder, despite having means for receiving and processing presentation and navigation data accommodated in a EPG type-3 transmission, is adapted to present and navigate through the information in a setmaker-defined manner. Such a decoder is technically feasible and may be attractive from the setmaker's point of view. The decoder may be adapted to scan all receivable television channels transmitting EPG information, store the transmitted data items in local non-volatile memory, and present and navigate through the data items in a consistent manner, irrespective of whether the data items have been acquired from a type-1, 2 or 3 transmission. A potential conflict will arise if data items are acquired from an EPG type-3 transmission while the layout and navigation data accommodated therein are ignored. Such a decoder possibly infringes the information provider's copyright.

According to the invention, a method is provided of transmitting data items to a receiver for selective display on said receiver, said data items being accompanied by auxiliary data comprising navigation data for informing the receiver how to navigate through said data items and/or presentation data for informing the receiver how to present the data items, and is characterized in that the auxiliary data includes control data to indicate whether or not the receiver is allowed to ignore said navigation and/or presentation data and to present and navigate through the data items in a receiver-defined manner.

By including said control data in the data signal, the information provider is now given the opportunity to explicitly permit or prohibit a decoder to present the information provided by him in a way which differs from the instructions included in the data signal. The control data may be associated with all data items, with groups of data items, or with individual data items.

A corresponding method of receiving the data items is characterized by the steps of receiving said control data included in said auxiliary data and ignoring, in response to a predetermined value of said control data, said navigation and/or presentation data and presenting and navigating through the data items in a receiver-defined manner. If the control data prohibits the receiver from presenting the data items in a setmaker-defined manner, the receiver may respond in different ways. One option is to adequately respond to the transmitted navigation and presentation data, thereby accepting inconsistency in the manner of presentation between data items received from one information provider or TV channel and data items received from another provider or channel. A further option is to omit the respective data items from a program guide composed of contributions from various information providers.

DESCRIPTION OF PREFERRED EMBODIMENTS

The invention will now be described with reference to the transmission of data items constituting an electronic program guide to a plurality of television receivers and/or video recorders. However, the invention is not restricted to this type of application. The method may be used in any data delivery system, in particular multimedia systems and home-shopping terminals.

Figure 1:
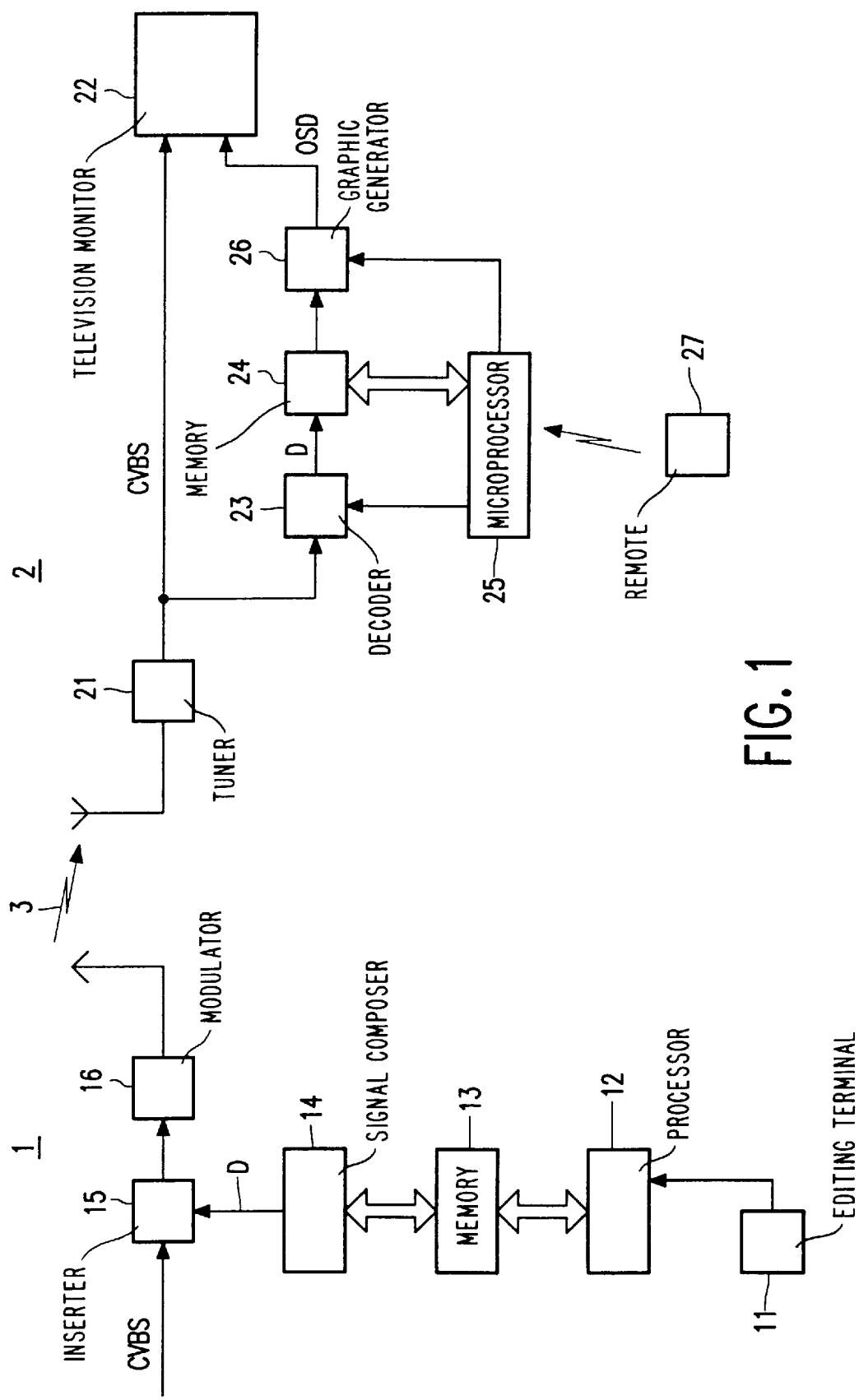
FIG. 1 shows a system comprising a transmitter 1 and a receiver 2 for carrying out the method according to the invention.

FIG. 1 shows a system comprising a transmitter 1 and a receiver 2 for carrying out the method according to the invention. The transmitter comprises an editing terminal 11 for creating the data items, a processor 12, a memory 13 for storing the data items, and a signal composer 14 for accommodating the information in a data signal D. The transmitter further comprises an inserter 15 for inserting the data signal D in the vertical blanking interval of a composite video signal CVBS. The television signal thus obtained is applied to a modulator 16 for broadcast through a transmission medium 3.

The receiver comprises a tuner 21 for receiving the television signal. The received signal CVBS is directly applied to a television monitor 22 so as to display the received television program. The signal is also applied to a data decoder 23 which is adapted to acquire the data signal and store the received data in a memory 24. A microprocessor 25 is connected to the memory 24 so as to process the data stored therein. The receiver further comprises a graphic generator 26 adapted to read a predetermined section of memory 24 and generate an On-Screen-Display picture OSD defined by the data stored in said memory section. The OSD picture includes a cursor, the position of which is defined by the microprocessor in response to positioning signals from a remote cursor control device 27. In practice, the receiver described above may be a videorecorder. The videorecorder may have an embedded display device 22 or an output for applying the display signals CVBS and OSD to a separate display device 22 such as a television set.

The EPG data items as well as auxiliary data for presenting the data items and navigating through the program guide are created by editorial staff using editing terminal 11. The data items are processed by processor 12 and stored in respective segments of memory 13. The signal composer 14 assembles the stored data items and forms the data signal D. Data which is most sensible to transmission errors, such as headers, dates and times, string lengths, identifiers, etc., are protected by a Hamming code.

Figure 2:
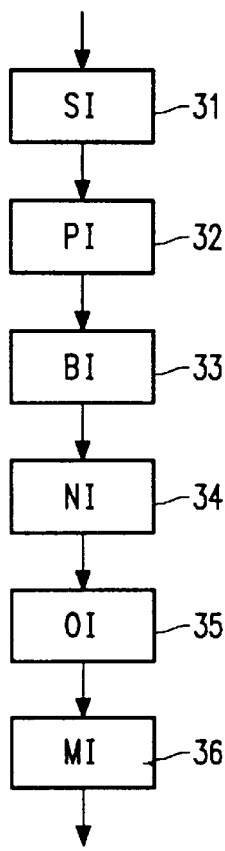
FIG. 2 shows a flowchart of transmission steps executed by the transmitter shown in FIG. 1.

FIG. 2 shows a flowchart of transmission steps executed by the transmitter. Each step includes the transmission of a section of the database, i.e. the transmission of a respective segment stored in memory 13. The various sections comprise Service Information SI (step 31), Programming Information PI (step 32), Background Information BI (step 33), Navigation Information NI (step 34), OSD Information OI (step 35) and Message Information MI (step 36), respectively. A more detailed description of these sections can be found on pages 22–31 of the Reference already mentioned in the opening paragraph of this Application.

According to the invention, one or more sections also include control data to indicate whether or not the receiver is allowed to ignore the navigation data (for example, NI) and/or presentation data (for example, BI, OI). In the following embodiments of the invention, said control data is transmitted in the form of a single bit. By setting this bit to zero, the information provider explicitly permits a receiver to present and navigate through the EPG data items in any suitable form. If this bit is set to one, the information provider expresses that the information may not be displayed in a different way than intended by himself.

In a first embodiment of the invention, the control bit is accommodated in the section Service Information (step 31) and is thus associated with all the EPG information provided for by the respective service. In a further embodiment, the control bit may be associated with a block of programs. In a third option, the control bit may be accommodated in the section Programming Information (step 32). In that case, a control bit is associated with each individual data item.

Figure 3:
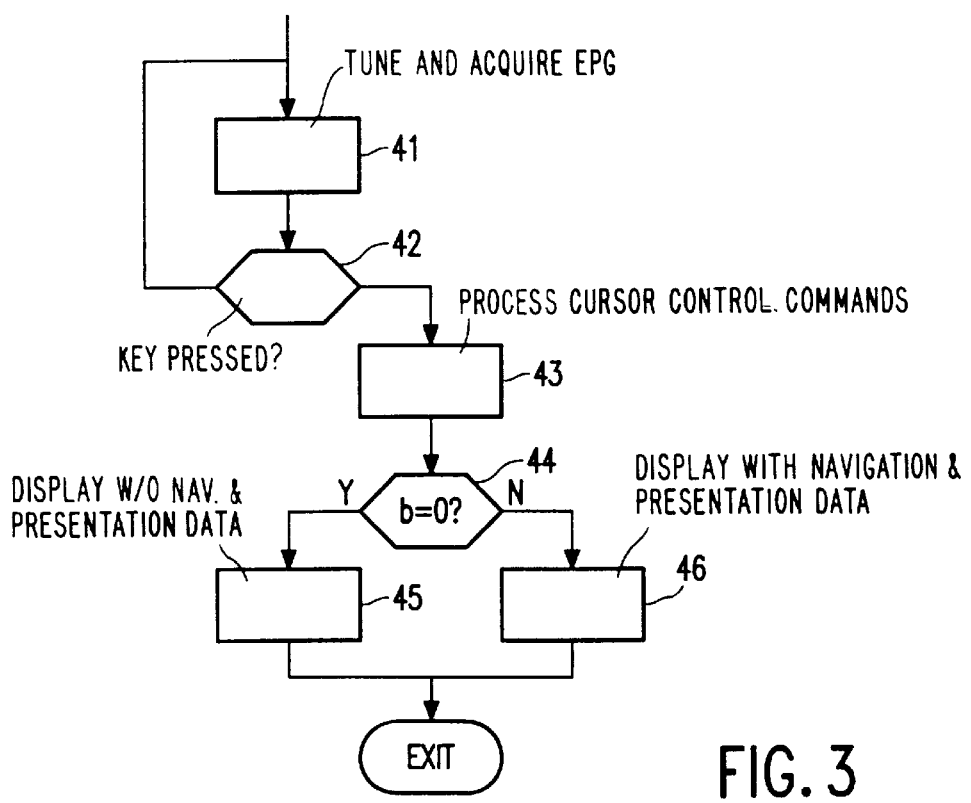
FIG. 3 shows a flowchart of receiving steps executed by the microprocessor of the receiver, shown in FIG. 1.

FIG. 3 shows a flowchart of receiving steps executed by the microprocessor 25 of the receiver. In an initial step 41, the microprocessor controls tuner 21 to successively tune to all receivable television stations and controls data decoder 23 to acquire EPG data items and store them in memory 24. In this step, the control bit associated with a service, a block of items or each individual data item is also stored. As long as the user has not pressed a key so as to consult the acquired information which is checked in a step 42, said operations of acquiring and updating of data items are continued.

In a step 43, the microprocessor receives and processes cursor control commands and determines which data item or block of data items must be presented (for example, all television program titles of a particular category, today's programs of a selected station, or all programs to be broadcast next).

In a step 44, the processor checks whether the stored control bit b is set to zero for the particular EPG service, the particular channel, the particular block or particular data item. If that is the case, a step 45 is performed in which the relevant information is displayed, thereby ignoring navigation and presentation information associated therewith. If the stored control bit is one, a step 46 is performed. In this step, the relevant information is displayed, taking into account the navigation and presentation information associated therewith. This may lead to a data item presentation which is completely different than that for other items. It may also cause completely different actions to be taken by the user to navigate through the database than before. Optionally, step 46 may mean that the relevant data items are not displayed at all. In that case, an appropriate message will be given to the user.

I claim:

1. A method of transmitting data items to a receiver for selective display on said receiver, comprising the steps of:

transmitting data items;

transmitting accompanying auxiliary data comprising navigation data for informing the receiver how to navigate through said data items and/or presentation data for informing the receiver how to present the data items; and transmitting control data to indicate whether or not the receiver is allowed to ignore said navigation and/or presentation data and to present and navigate through the data items in a receiver-defined manner.

2. A method as claimed in claim 1, wherein the data items collectively constitute an electronic television program guide.

3. A method as claimed in claim 1, wherein the data items collectively constitute a database of products for electronic shopping purposes.

4. A method as claimed in claim 1, wherein said control data is a single bit, one value of which indicates whether or not the receiver is allowed to ignore said navigation and/or presentation data and to present and navigate through the data items in a receiver-defined manner.

5. A transmitter for transmitting data items to a receiver for selective display on said receiver, said data items being accompanied by auxiliary data comprising navigation data for informing the receiver how to navigate through said data items and/or presentation data for informing the receiver how to present the data items, characterized in that the auxiliary data includes control data to indicate whether or not the receiver is allowed to ignore said navigation and/or presentation data and to present and navigate through the data items in a receiver-defined manner.

6. A method of receiving and selectively displaying data items received from a transmitter transmitting said date items, comprising the steps of:

receiving the data items;

receiving accompanying auxiliary data comprising navigation data for informing the receiver how to navigate through said data items and/or presentation data for informing the receiver how to present the data items; and receiving control data which indicates whether or not the receiver is allowed to ignore said navigation and/or presentation data and to present and navigate through the data items; and ignoring, in response to a predetermined value of said control data, said navigation and/or presentation data and presenting and/or navigating through the data items in a receiver-defined manner.

7. A method as claimed in claim 6, wherein the data items collectively constitute an electronic television program guide.

8. A method as claimed in claim 6, wherein the data items collectively constitute a database of products for electronic shopping purposes.

9. A method as claimed in claim 6, wherein said control data is a single bit, one value of which indicates whether or not the receiver is allowed to ignore said navigation and/or presentation data and to present and navigate through the data items in a receiver-defined manner.

10. A method as claimed in claim 7, further comprising the step of acquiring and storing the data items received from a plurality of different television channels, characterized by the step of omitting the display of data items for which said control data does not have said predetermined value.

11. A receiver for receiving and selectively displaying data items received from a transmitter transmitting said data items, the data items being accompanied by auxiliary data comprising navigation data for informing the receiver how to navigate through said data items and/or presentation data for informing the receiver how to present the data items, characterized in that the receiver is adapted to receive control data included in said auxiliary data and to ignore, in response to a predetermined value of said control data, said navigation and/or presentation data and to present and navigate through the data items in a receiver-defined manner.

12. A data signal comprising data items for selective display on a receiver, said data items being accompanied by auxiliary data comprising navigation data for informing the receiver how to navigate through said data items and/or presentation data for informing the receiver how to present the data items, characterized in that the auxiliary data includes control data to indicate whether or not the receiver is allowed to ignore said navigation and/or presentation data and to present and navigate through the data items in a receiver-defined manner.

* * * * *